Aug. 17, 1954
A. S. KUSHNIR
2,686,690
LAWN WEEDER
Filed June 16, 1950
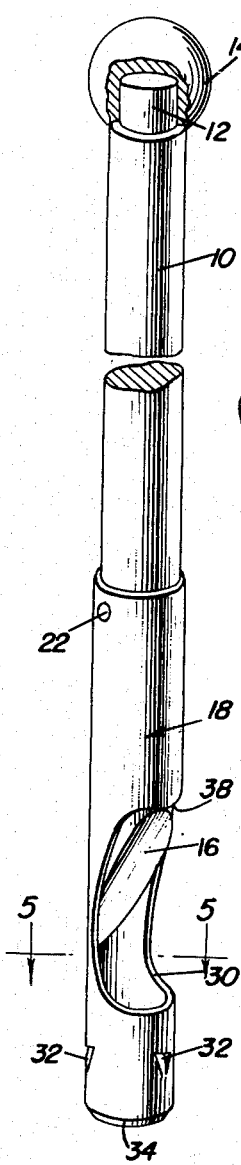
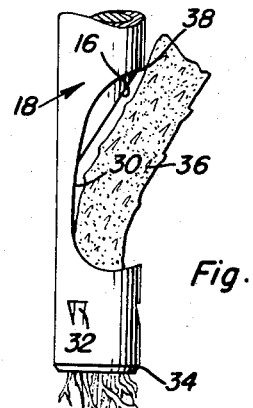
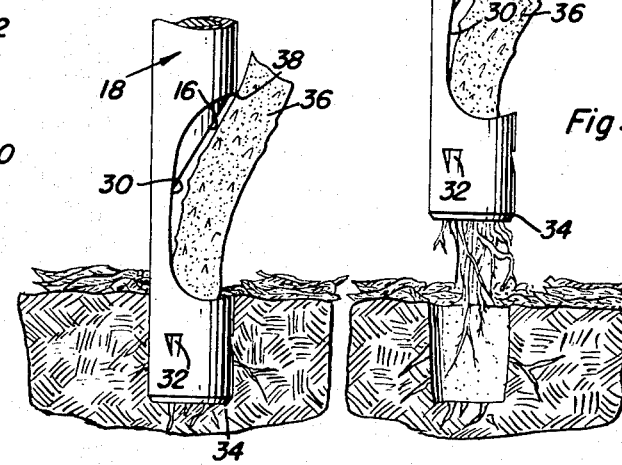
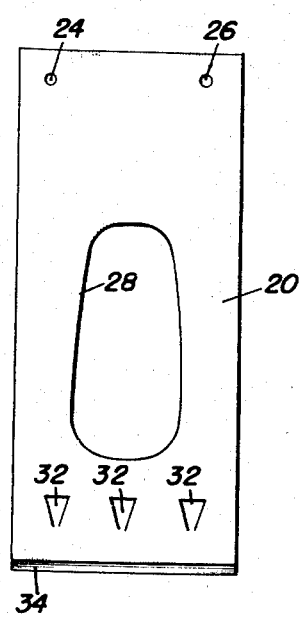
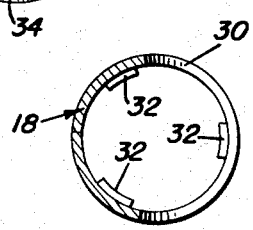
Andrew S. Kushnir
INVENTOR.

Patented Aug. 17, 1954

2,686,690

UNITED STATES PATENT OFFICE 2,686,690

LAWN WEEDER

Andrew S. Kushnir, Pulaski, Pa.

Application June 16, 1950, Serial No. 168,409

1 Claim. (Cl. 294—50.7)

This invention relates to improvements in weeders.

An object of this invention is to provide an improved device for removing weeds from a lawn, injuring only a bare minimum of the grass around the weed, said weeder being composed of a handle which has a beveled end portion disposed in a sleeve or tube at the lower end of the handle, said sleeve or tube having a laterally opening notch therein through which the weed is adapted to pass when removing the same from the ground and having a means to firmly grip the weed at the lower open end of the tube.

Ancillary objects and features of importance will become apparent in following the description of the illustrated form of the invention.

In the drawings:

Figure 1 is a perspective view of the device;

Figure 2 is a fragmentary elevational view of the device showing it in one step of operation;

Figure 3 is a fragmentary elevational view showing the device in another sequential step of operation;

Figure 4 is a developed view of the material from which the sleeve is shaped; and Figure 5 is a transverse sectional view taken substantially on the line 5—5 of Figure 1 and in the direction of the arrows.

In carrying out this invention, I have provided a handle or shank 10 with a stud 12 at the upper end thereof, on which is seated a hand grip 14, which, for the sake of illustration, is shown as substantially spherical. The lower end of the handle or shank 10 is bevelled to provide the bevelled surface 16.

A sleeve or tube 18 made from the blank 20 is disposed on the lower end of the handle 10 and is held in place by means of a number of rivets 22 which pass through holes 24 and 26 formed in the blank 10.

Said blank 20 is provided with an opening 28, whereby, when the blank 20 is curved to a tubular condition, the lateral opening or notch 30 is formed. The lower end of the handle 10 including the surface 16 is disposed in this opening (Figure 1).

A means for gripping the weed is provided at the lower end of the sleeve 18. This means consists of tongues 32 which are almost triangular in shape (Figure 4) and which extend inwardly of the bore of the tube.

The lower edge of the tube 18 is sharpened, as at 34, to provide a cutter so that the sleeve will pass into the ground easily for shearing or cutting the roots of the typical weed 36.

In operation, the lower open end of the sleeve or tube is projected in the ground so that the top of the weed is cut by the cutter 34 and then the tube is passed over the remainder of the weed 36 so that it is in concentric relation therewith. Further pressure upon the handle 10 urges the sleeve or tube 18 farther into the ground as disclosed in Figure 2. Then, the handle 10 is lifted, causing the tongues 32 to adhere to the weed, penetrating it. When the handle is lifted so that the tube is pulled from the ground, the weed 36 is pulled with it.

When the weed is being passed through the openings 30 as disclosed in Figure 2, the bevelled surface 16 acts as a guide to direct the upper end of the weed 36 through the opening 30. A binding action between the weed and the implement is produced inasmuch as the weed is caused to be bent, pressing against the upper edge 38 of the opening 30 and against the side wall of the tube 18 in the region of the tongues 32.

Having described the invention, what is claimed as new is:

A weeder comprising an elongated handle, a tube mounted on one end portion of said handle and projecting longitudinally therefrom, a cutting edge on the outer end of the tube, said tube having an opening therein at an intermediate point, said one end portion of the handle including a beveled face adjacent the opening, and a plurality of tapered tongues struck inwardly from the lower portion of the tube at circumferentially spaced points with their wide ends free and uppermost and engageable with a weed for anchoring same against downward movement in the tube.

References Cited in the file of this patent

UNITED STATES PATENTS

| Number | Name | Date |
|---|---|---|
| 828,452 | Barry | Aug. 14, 1906 |
| 1,065,456 | Lowrey | June 24, 1913 |
| 2,194,597 | Johnson | Mar. 26, 1940 |